(12) United States Patent
Ozue et al.

(10) Patent No.: US 6,411,473 B1
(45) Date of Patent: *Jun. 25, 2002

(54) ROTARY DRUM DEVICE AND MAGNETIC RECORDING/REPRODUCING APPARATUS HAVING A MORE PROTRUDING INDUCTIVE MAGNETIC HEAD RELATIVE TO MAGNETORESISTIVE HEAD

(75) Inventors: Tadashi Ozue; Toshio Shirai; Yoshiteru Kamatani, all of Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/262,328

(22) Filed: Mar. 4, 1999

(30) Foreign Application Priority Data

Mar. 12, 1998 (JP) ............................................. 10-061689

(51) Int. Cl.⁷ ................................................ G11B 15/61
(52) U.S. Cl. .................................................... 360/271.5
(58) Field of Search ............................ 360/271.5, 317, 360/318, 237.1, 236.5

(56) References Cited

U.S. PATENT DOCUMENTS

| | | | | |
|---|---|---|---|---|
| 4,225,892 A | * | 9/1980 | Bassett et al. | 360/113 |
| 4,594,619 A | * | 6/1986 | Hijikigawa | 360/74.4 |
| 5,239,432 A | * | 8/1993 | Kuroda | 360/107 |
| 5,455,730 A | * | 10/1995 | Dovek et al. | 360/113 |
| 5,513,051 A | * | 4/1996 | Lee et al. | 360/77.16 |
| 5,734,532 A | * | 3/1998 | Kobayashi et al. | 360/113 |
| 5,737,154 A | * | 4/1998 | Kumagai et al. | 360/108 |
| 5,822,153 A | * | 10/1998 | Lairson et al. | 360/104 |
| 5,896,243 A | * | 4/1999 | Koshikawa et al. | 360/103 |
| 5,991,119 A | * | 11/1999 | Boutaghou et al. | 360/103 |
| 5,995,324 A | * | 11/1999 | Haddock et al. | 360/103 |
| 6,128,163 A | * | 10/2000 | Haddock et al. | 360/237.1 |

FOREIGN PATENT DOCUMENTS

JP          10-188224       *   7/1998

* cited by examiner

Primary Examiner—Brian E. Miller
(74) Attorney, Agent, or Firm—Sonnenschein, Nath & Rosenthal

(57) ABSTRACT

A rotary drum device and a helical scan magnetic recording/reproducing apparatus employing an MR head as a playback magnetic head. The rotary drum device and the helical scan magnetic recording/reproducing apparatus each include a cylindrically-shaped rotary drum, an inductive magnetic head loaded on the rotary drum so that its portion is protruded from the outer periphery of the rotary drum and a magneto-resistive effect magnetic head loaded on the rotary drum so that its portion is protruded from the outer periphery of the rotary drum. An amount of protrusion from the outer periphery of the rotary drum of the magneto-resistive effect magnetic head is smaller than an amount of protrusion from the outer periphery of the rotary drum of the inductive magnetic head.

4 Claims, 8 Drawing Sheets

ROTARY DRUM DEVICE AND MAGNETIC RECORDING/REPRODUCING APPARATUS HAVING A MORE PROTRUDING INDUCTIVE MAGNETIC HEAD RELATIVE TO MAGNETORESISTIVE HEAD

RELATED APPLICATION DATA

The present application claims priority to Japanese Application No. P10-061689 filed Mar. 12, 1998 which application is incorporated herein by reference to the extent permitted by law.

BACKGROUND OF THE INVENTION

1. Field of the Invention

This invention relates to a rotary drum in which a magneto-resistive effect magnetic head is used as a reproducing magnetic head, and to a helical scan magnetic recording/reproducing apparatus carrying the rotary drum.

2. Description of the Related Art

In a magnetic recording/reproducing apparatus, such as a video tape recorder, audio tape recorder or a data storage system for a computer, employing a magnetic tape as a recording medium, there is adopted a helical scan system for improving the recording density to increase the recording capacity.

In this magnetic recording/reproducing apparatus, a higher recording density and a larger recording capacity are desired. For realizing this higher recording density and a larger recording capacity, it has been proposed to use a magneto-resistive effect magnetic head (MR head) as a playback magnetic head in the helical scan magnetic recording/reproducing apparatus.

The MR head uses a magneto-resistive effect element (MR element) as a magnetically sensitive element for detecting the magnetic field from the recording medium, and is put to practical use as a playback magnetic head of the hard disc drive. In general, the MR head is higher in sensitivity than the inductive magnetic head and is able to develop a large playback output. Thus, by using the MR head as the playback magnetic head, it is possible to realize a still higher recording density and a still larger recording capacity.

Meanwhile, in a hard disc drive, the MR head is loaded on the floating slider, so that data is reproduced under a condition in which the MR head is floated over the magnetic disc. On the other hand, if the MR head is used for the helical scan system, data is reproduced from the magnetic disc as the MR head is kept in sliding contact with the magnetic tape.

However, if the MR head is kept in sliding contact with the magnetic tape, there is presented a problem that, even if the playback output of the MR head is larger, the MR head is worn out due to its sliding contact with the magnetic tape. If the MR head is worn out, the playback output level is fluctuated to increase the noise and so-called dropout. For this reason, the helical scan magnetic recording/reproducing apparatus employing the MR head as the playback magnetic head has as yet not been put to practical use.

SUMMARY OF THE INVENTION

It is therefore an object of the present invention to provide a rotary drum device employing the MR head as the playback magnetic head, and a magnetic recording/reproducing apparatus of the helical scan system.

In one aspect, the present invention provides a rotary drum device including a cylindrically-shaped rotary drum, an inductive magnetic head loaded on the rotary drum so that a portion thereof is protruded from the outer periphery of the rotary drum, and a magneto-resistive effect magnetic head loaded on the rotary drum so that a portion thereof is protruded from the outer periphery of the rotary drum. An amount of protrusion from the outer periphery of the rotary drum of the magneto-resistive effect magnetic head is selected to be smaller than an amount of protrusion from the outer periphery of the rotary drum of the inductive magnetic head.

In the rotary drum device according to the present invention, in which the amount of protrusion of the magneto-resistive effect magnetic head is selected to be smaller than that of the inductive magnetic head, the contact pressure between the magneto-resistive effect magnetic head and the magnetic tape is smaller than that between the inductive magnetic head and the magnetic tape.

In another aspect, the present invention provides a rotary drum device including a cylindrically-shaped rotary drum, an inductive magnetic head loaded on the rotary drum and having a cylindrical sliding surface for the magnetic tape and a magneto-resistive effect magnetic head loaded on the rotary drum and having a cylindrical sliding surface for the magnetic tape. The radius of curvature of the sliding surface for the magnetic tape of the magneto-resistive effect magnetic head is selected to be larger than that of the sliding surface for the magnetic tape of the inductive magnetic head.

In this rotary drum device according to the present invention, in which the radius of curvature of the sliding surface of the magneto-resistive effect magnetic head is selected to be larger than that of the sliding surface of the inductive magnetic head, the contact pressure between the magneto-resistive effect magnetic head and the magnetic tape is smaller than that between the inductive magnetic head and the magnetic tape.

In still another aspect of the present invention, the present invention provides a magnetic recording/reproducing apparatus which is a helical scan magnetic recording/reproducing apparatus including a cylindrically-shaped rotary drum, an inductive magnetic head loaded on the rotary drum so that a portion thereof is protruded from the outer periphery of the rotary drum, and a magneto-resistive effect magnetic head loaded on the rotary drum so that a portion thereof is protruded from the outer periphery of the rotary drum. An amount of protrusion from the outer periphery of the rotary drum of the magneto-resistive effect magnetic head is selected to be smaller than an amount of protrusion from the outer periphery of the rotary drum of the inductive magnetic head.

In this magnetic recording/reproducing apparatus according to the present invention, in which the amount of protrusion of the magneto-resistive effect magnetic head is selected to be smaller than that of the inductive magnetic head, the contact pressure between the magneto-resistive effect magnetic head and the magnetic tape is smaller than that between the inductive magnetic head and the magnetic tape.

In yet another aspect, the present invention provides a helical scan magnetic recording/reproducing apparatus including a cylindrically-shaped rotary drum, an inductive magnetic head loaded on the rotary drum and having a cylindrical sliding surface for the magnetic tape and a magneto-resistive effect magnetic head loaded on the rotary drum and having a cylindrical sliding surface for the magnetic tape. The radius of curvature of the sliding surface for the magnetic tape of the magneto-resistive effect magnetic head is selected to be larger than that of the sliding surface for the magnetic tape of the inductive magnetic head.

In this magnetic recording/reproducing apparatus according to the present invention, in which the radius of curvature of the sliding surface of the magneto-resistive effect magnetic head is selected to be larger than that of the sliding surface of the inductive magnetic head, the contact pressure between the magneto-resistive effect magnetic head and the magnetic tape is smaller than that between the inductive magnetic head and the magnetic tape.

DESCRIPTION OF THE PREFERRED EMBODIMENTS

Referring to the drawings, preferred embodiments of the present invention will be explained in detail.

The magnetic recording/reproducing apparatus according to the present invention is such a magnetic recording/reproducing apparatus employing a magnetic tape as a recording medium, and is used as a video tape recorder, an audio tape recorder or a data storage system for a computer. The magnetic recording/reproducing apparatus according to the present invention is a helical scan magnetic recording/reproducing apparatus doing recording/reproduction using a rotary drum, and employs an MR head as a playback head loaded on the rotary drum.

Figure 1:
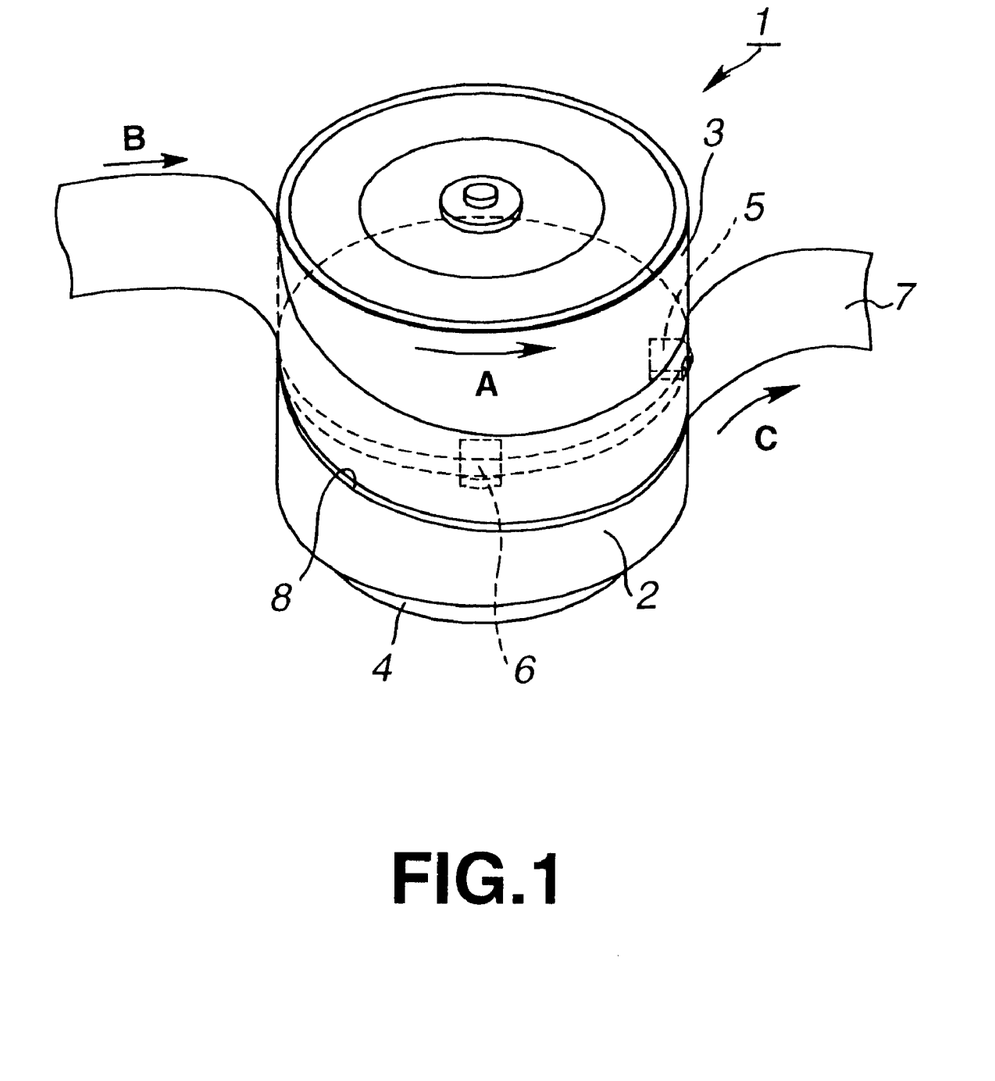
FIG. 1 is a perspective view showing an illustrative structure of a rotary drum device according to the present invention.

FIG. 1 shows an illustrative structure of a rotary drum device 1 loaded on a magnetic recording/reproducing apparatus embodying the present invention. FIG. 1 is a schematic perspective view showing the rotary drum device 1.

Referring to FIG. 1, the rotary drum device 1 includes a cylindrically-shaped fixed drum 2, a cylindrically-shaped rotary drum 3, a motor 4 for rotationally driving the rotary drum 3, an inductive magnetic head 5 and an MR head 6 loaded on the rotary drum 3.

Although the rotary drum device 1 of a so-called upper drum type having the rotary drum 3 arranged on the fixed drum 2, the present invention is applicable to a helical scan magnetic recording/reproducing apparatus without being limited to particular types of the rotary drum device 1. For example, a so-called mid drum type rotary drum device, in which the rotary drum 3 is held between the paired fixed drums 2, may also be used.

In the above rotary drum device 1, the fixed drum 2 is a drum that is held without rotation. On the lateral side of the fixed drum 2 is formed a reel guide portion 8 for extending along the running direction of the magnetic tape 3. During recording/reproduction, the magnetic tape 7 is caused to run along the reel guide portion 8. The rotary drum 3 is arranged with its center axis coincident with that of the fixed drum 2.

The rotary drum 3 is run in rotation at a pre-set rpm by the motor 4 during recording/reproduction for the magnetic tape 7. This rotary drum 3 is of a cylindrical shape substantially of the same diameter as the fixed drum 2 and is arranged with its center axis coincident with that of the fixed drum 2. On the side of the rotary drum 3 facing the fixed drum 2 are loaded the inductive magnetic head 5 and the MR head 6.

The inductive magnetic head 5 has a pair of magnetic cores joined together via a magnetic gap and having coils placed thereon. The inductive magnetic head 5 is used for recording data on the magnetic tape 7.

Figure 2:
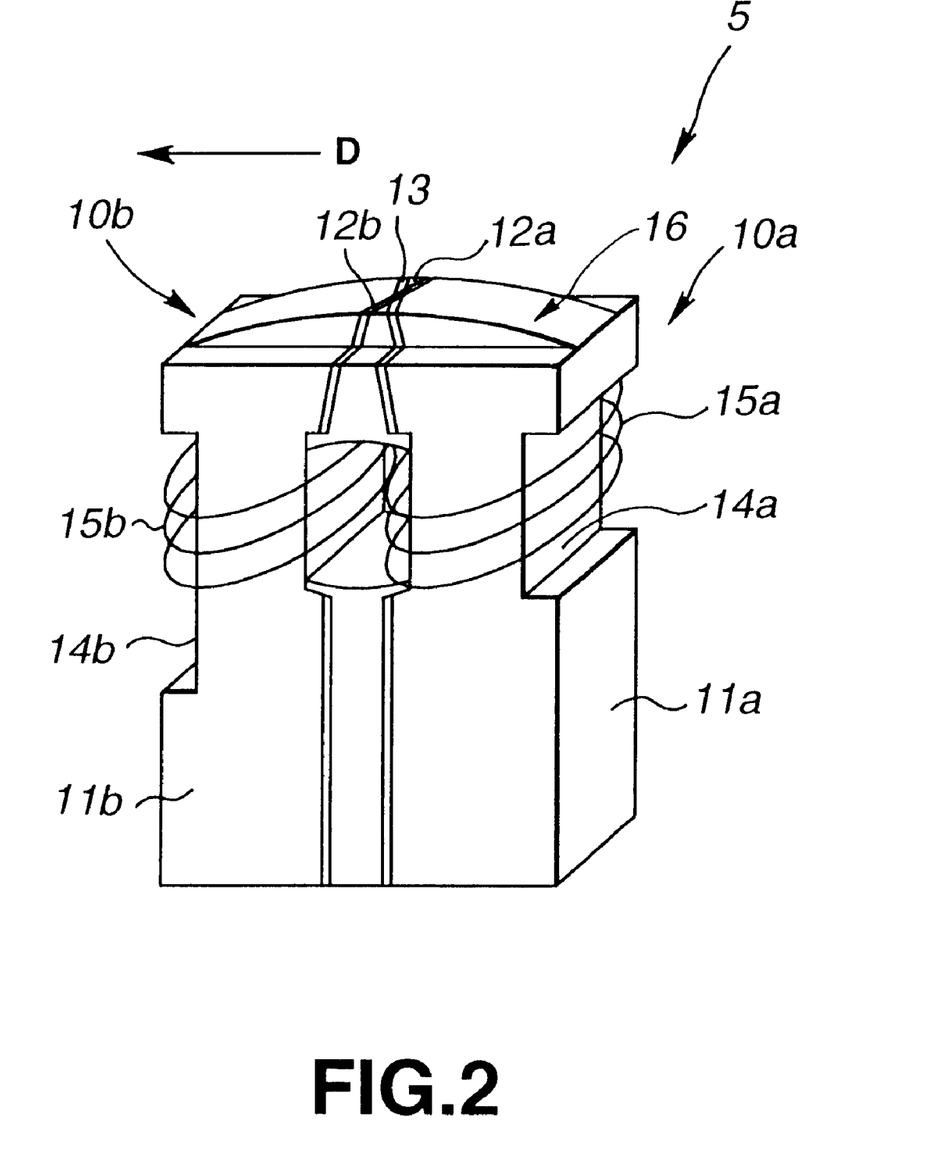
FIG. 2 is a perspective view showing a typical inductive magnetic head loaded on the rotary drum.

For this inductive magnetic head 5, any known recording magnetic head used in the conventional helical scan magnetic recording/reproducing apparatus may be used. Specifically, a so-called metal-in-gap (MIG) magnetic head an which magnetic cores 10a, 10b are made up of soft magnetic substrates 11a, 11b of ferrite and magnetic metal films 12a, 12b formed on the soft magnetic substrates 11a, 11b, the paired magnetic cores 10a, 10b are joined together, with the magnetic gap 13 in-between, so that the magnetic metal films 12a, 12b face each other, and in which coils 15a, 15b are placed in winding grooves 14a, 14b, is most preferred.

This inductive magnetic head 5 is loaded on the rotary drum 3 so that at least a portion thereof is protruded from the outer rim of the rotary drum 3. Moreover, this inductive magnetic head 5 has its sliding surface 16 for the magnetic tape 7 ground cylindrically along the sliding direction of the inductive magnetic head 5 with respect to the magnetic tape 7, as indicated by arrow D, and along a direction at right angles to the sliding direction.

That is, the sliding surface 16 for the magnetic tape of the inductive magnetic head 5 is substantially spherically shaped with the most protuberant portions thereof being the magnetic gap 13 and its neighboring portions. This inductive magnetic head 5 is mounted on the rotary drum 3 so that the magnetic gap 13 and its near-by portion are protruded from the outer rim of the rotary drum 3.

The MR head 6 is a read-only magnetic head having the MR element as a magnetic sensitive element for detecting magnetic signals from the magnetic tape 7 by exploiting the magneto-resistive effect. Since the MR head 6 in general is higher in sensitivity and larger in playback output than the inductive magnetic head 5 doing recording/reproduction by exploiting the electromagnetic induction and hence is suited to high density recording. Therefore, higher recording density can be achieved by employing the MR head 6 as the playback magnetic head.

Figure 3:
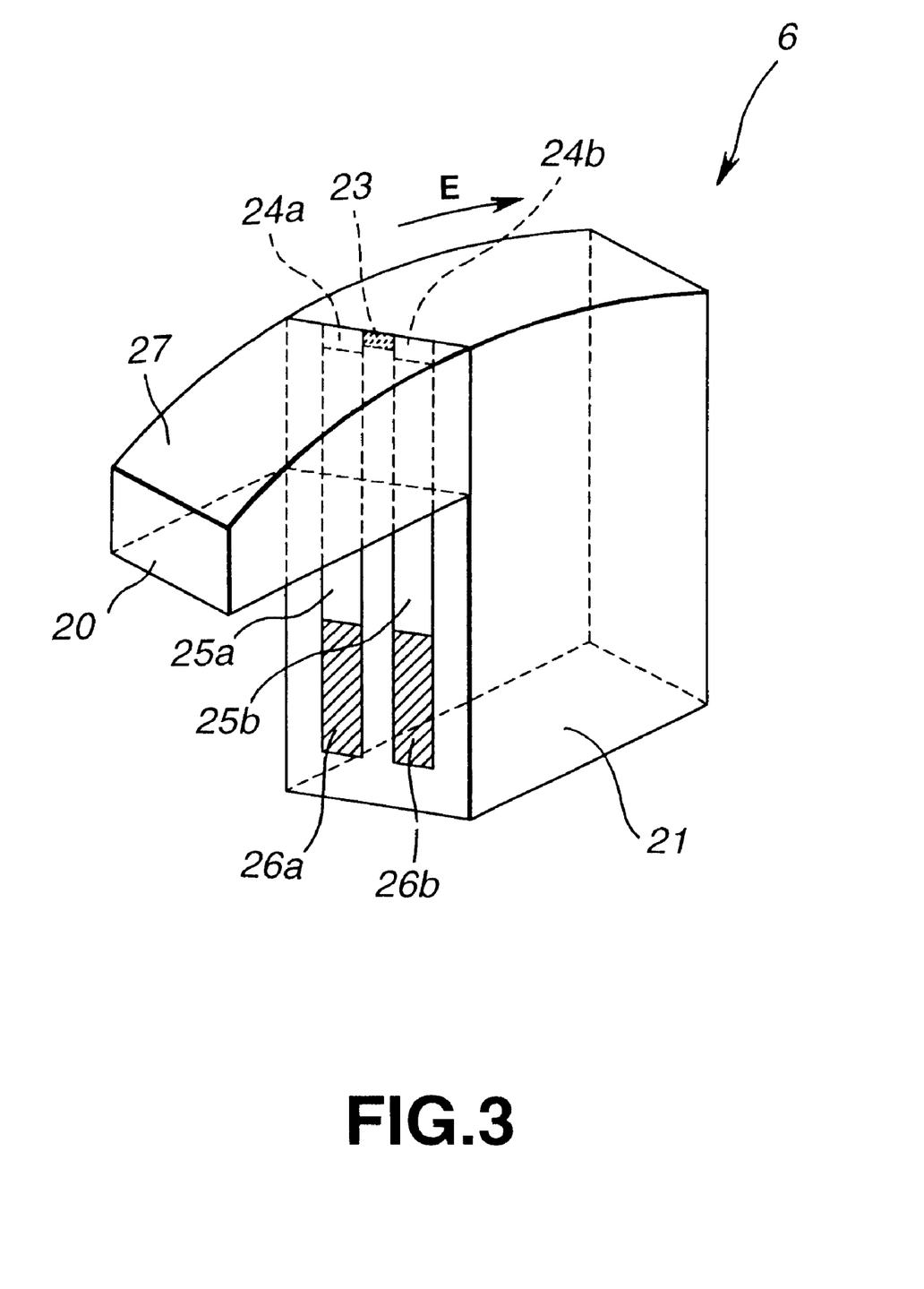
FIG. 3 is a perspective view showing a typical MR head loaded on the rotary drum.
Figure 4:
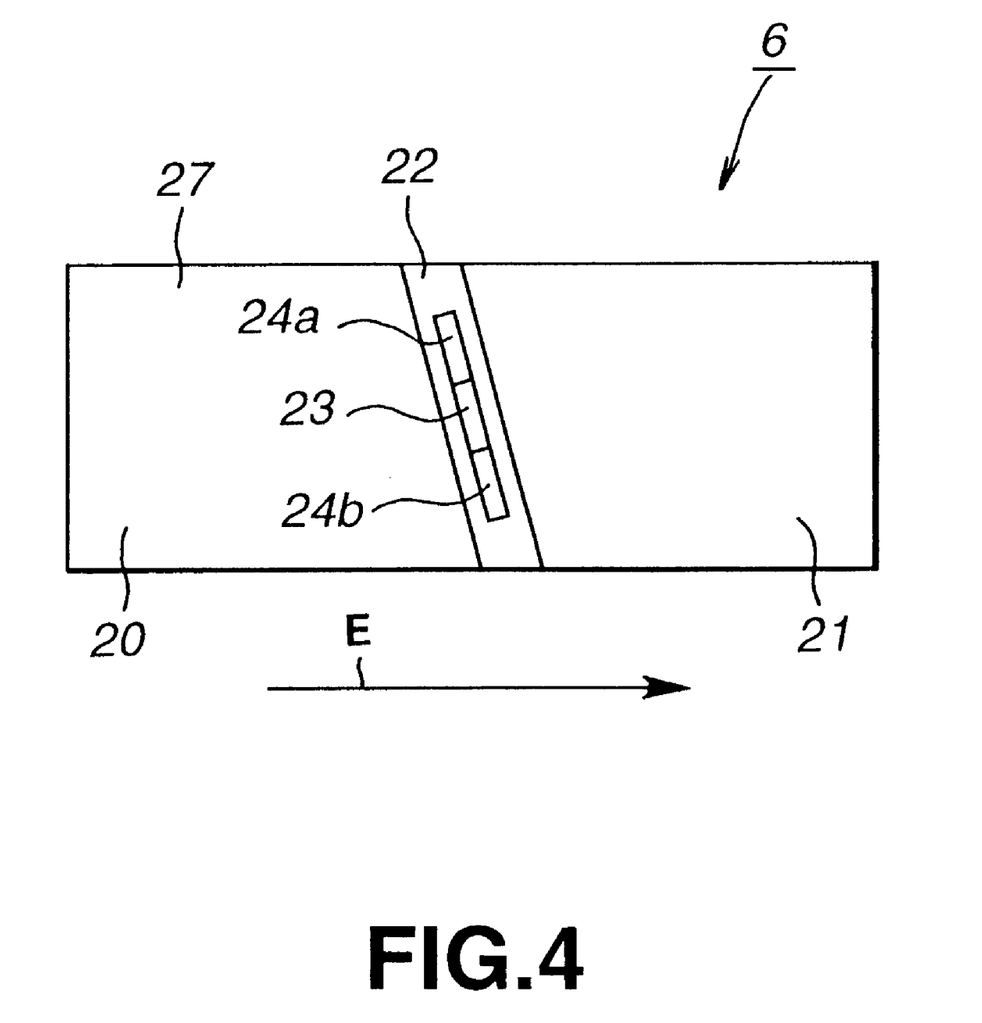
FIG. 4 is a plan view showing the MR head as viewed from the tape slide surface.

Referring to FIGS. 3 and 4, this MR head 6 includes a pair of magnetic shields 20, 21, formed of a soft magnetic material, an MR element unit 23 sandwiched via an insulator 22 by the magnetic shields 20, 21, permanent magnet films 24a, 24b arranged on both ends of the MR element unit 23 and conductors 25a, 25b connected to the permanent magnet films 24a, 24b, respectively.

The MR element unit 23 is made up of an MR element exhibiting the magneto-resistive effect, a soft adjacent layer (SAL) film for applying a perpendicular bias magnetic field across the MR element and an insulating film arranged between the MR element and the SAL film.

The permanent magnet films 24a, 24b apply the horizontal magnetic field across the MR element. The conductors 25a, 25b send the sense current to the MR element via external terminals 26a, 26b formed at terminal ends.

In this MR head 6, the MR element unit 23 is of a substantially rectangular plan configuration, and is sandwiched via insulator 22 between the magnetic shields 21, 22 so that the short-axis direction of the MR element unit 23 is substantially perpendicular to the sliding surface 27 for the magnetic tape and a lateral side of the MR element unit 23 is exposed to the sliding surface 27 for the magnetic tape.

This MR head 6 is loaded on the rotary drum 3 so that at least a portion thereof is protruded from the outer periphery of the rotary drum 3. The MR head 6 also has the slide surface 27 for the magnetic tape ground cylindrically along the sliding direction of the MR head 6 with respect to the magnetic tape 7 and along the direction perpendicular to the sliding direction.

That is, the sliding surface 27 for the magnetic tape of the MR head 6 is substantially spherical in profile so that the MR element unit 23 and its neighboring portion are protruded most outstandingly. The MR head 6 is loaded on the rotary drum 3 so that the MR element unit 23 and its neighboring portion are protruded from the outer rim of the rotary drum 3.

Figure 5:
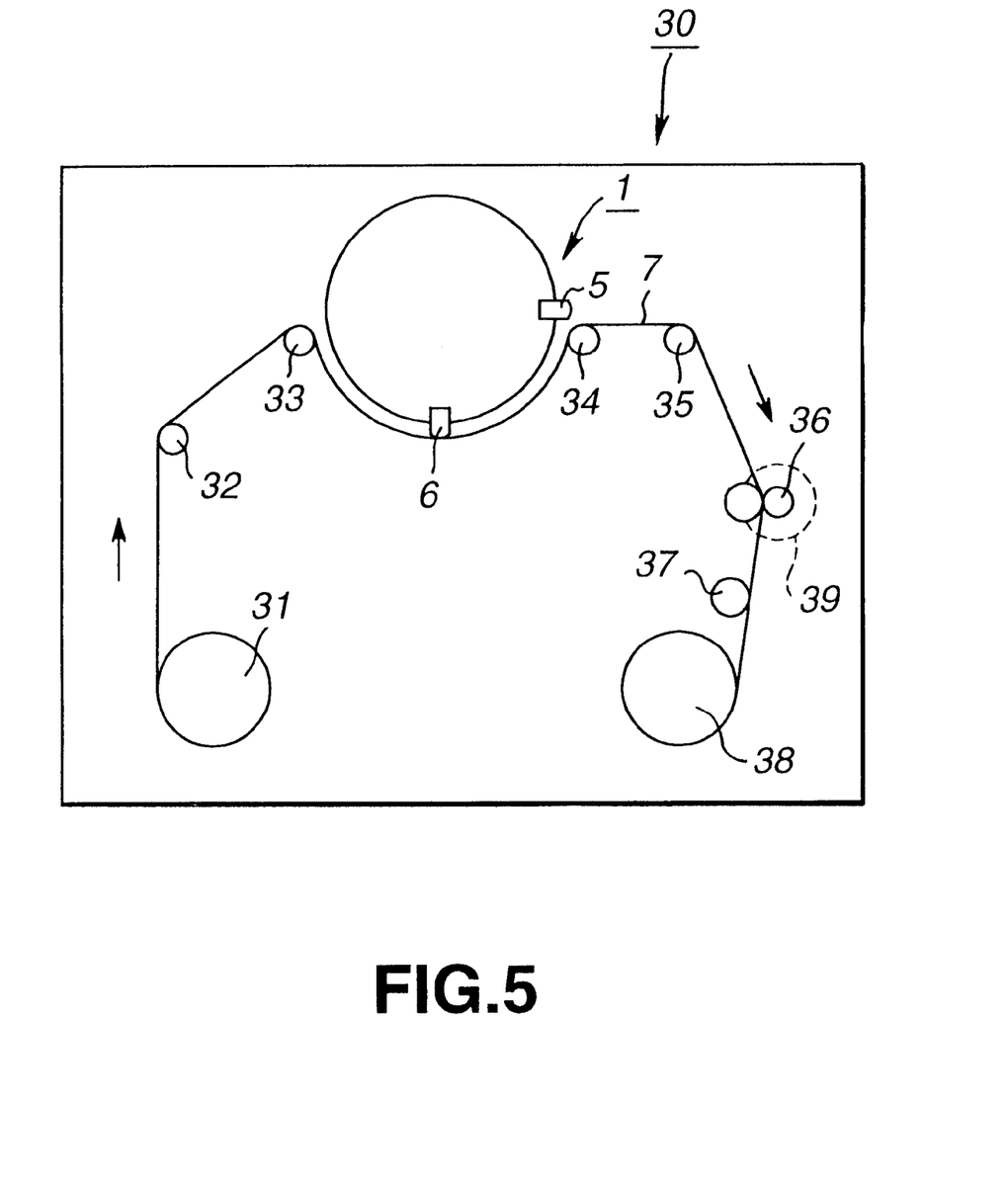
FIG. 5 is a schematic plan view showing an illustrative structure of a magnetic tape feed mechanism including the rotary drum.

With the magnetic recording/reproducing apparatus, the magnetic tape 7 is slid with respect to the rotary drum device 1 in order to record data on the magnetic tape 7 or reproduce data from the magnetic tape 7. FIG. 5 is schematic plan view of a magnetic tape feed mechanism 30 including the rotary drum device 1.

Specifically, during recording/reproduction, the magnetic tape 7 is fed from a supply reel 31 through guide rolls 32, 33 so as to be entwined about the rotary drum device 1, as shown in FIG. 5, in order to be recorded or reproduced by this rotary drum device 1.

For recording data on the magnetic tape 7, the magnetic tape 7 is slid against the inductive magnetic head 5 to effect recording by the inductive magnetic head 5. For reproducing data from the magnetic tape 7, the magnetic tape 7 is slid with respect to the MR head 6 to reproduce data recorded by the inductive magnetic head 5 by the MR head 6.

If the magnetic tape 7 is slid with respect to the inductive magnetic head 5 or the MR head 6, the magnetic tape 7 is supported mainly by the rotary drum 3 and by an air stream generated by rotation of the rotary drum 3. At this time, the inductive magnetic head 5, of which the magnetic gap 13 and its neighboring portion are protruded from the outer rim of the rotary drum 3, and the MR head 6, of which the MR element unit 23 and its neighboring portion are protruded from the outer rim of the rotary drum 3, are brought into contact with the magnetic tape 7 to form a tent-like shape in the magnetic tape 7. It is noted that, since the inductive magnetic head 5 has the sliding surface 14 for the magnetic tape ground cylindrically so that the magnetic gap 13 and its neighboring portion are protruded most prominently, and is loaded on the rotary drum 3 so that the ground portion is protruded from the outer rim of the rotary drum 3, the magnetic gap 13 has optimum abutment characteristics with respect to the magnetic tape 7. On the other hand, MR head 6 has the sliding surface 27 for the magnetic tape ground cylindrically so that the MR element unit 23 and its neighboring portion 23 are protruded most prominently, and is loaded on the rotary drum 3 so that its portion is protruded from the outer rim of the rotary drum 3, the MR element unit 23 has optimum abutment characteristics with respect to the magnetic tape.

The magnetic tape 7, recorded or reproduced by the rotary drum device 1, is routed via guide rolls 34, 35, a capstan 36 and a guide roll 37 to a take-up roll 38. That is, the magnetic tape 7 is fed at a pre-set tension and velocity by the capstan 36 run in rotation by a capstan motor 39 and brought into sliding contact at a pre-set contact pressure with the inductive magnetic head 5 and with the MR head 6 loaded on the rotating rotary drum 3 so as to be taken up on the take-up roll 38.

Thus, in this rotary drum device 1, the capstan 36, run in rotation by the capstan motor 39, operates as contact pressure control means for controlling the contact pressure between the inductive magnetic head 5 and the MR head 6 on one hand and the magnetic tape 7 on the other hand.

When the magnetic tape 7 is fed in this manner, the rotary drum 3 is run in rotation by the motor 4 as indicated by arrow A in FIG. 1. On the other hand, the magnetic tape 7 is fed so as to slide obliquely relative to the fixed drum 2 and the rotary drum 3 along the reel guide portion 8 of the fixed drum 2. That is, the magnetic tape 7 is sent along the reel guide portion 8 in the tape running direction from the tape inlet side in sliding contact with the fixed drum 2 and the rotary drum 3 as indicated by an arrow B in FIG. 1, so as to be then routed to the tape outlet side, as indicated by arrow C in FIG. 1.

However, if the magnetic tape 7 is slid at an elevated speed relative to the magnetic head, the sliding surface for the magnetic tape i worn out by sliding movement relative to the magnetic tape 7. In particular, the MR head 6 is susceptible to attrition. The magnitude of tolerance of the MR head 6 with respect to the attrition is said in general to be approximately one-fifth to one-twentieth that of the inductive magnetic head 5.

If the inductive magnetic head 5 and the MR head 6 are loaded on the same rotary drum 3, the MR head 6 is affected more significantly by attrition than the inductive magnetic head 5, and reaches its limit attrition sooner to become unusable, even although the inductive magnetic head 5 is still sufficiently usable.

Figure 6:
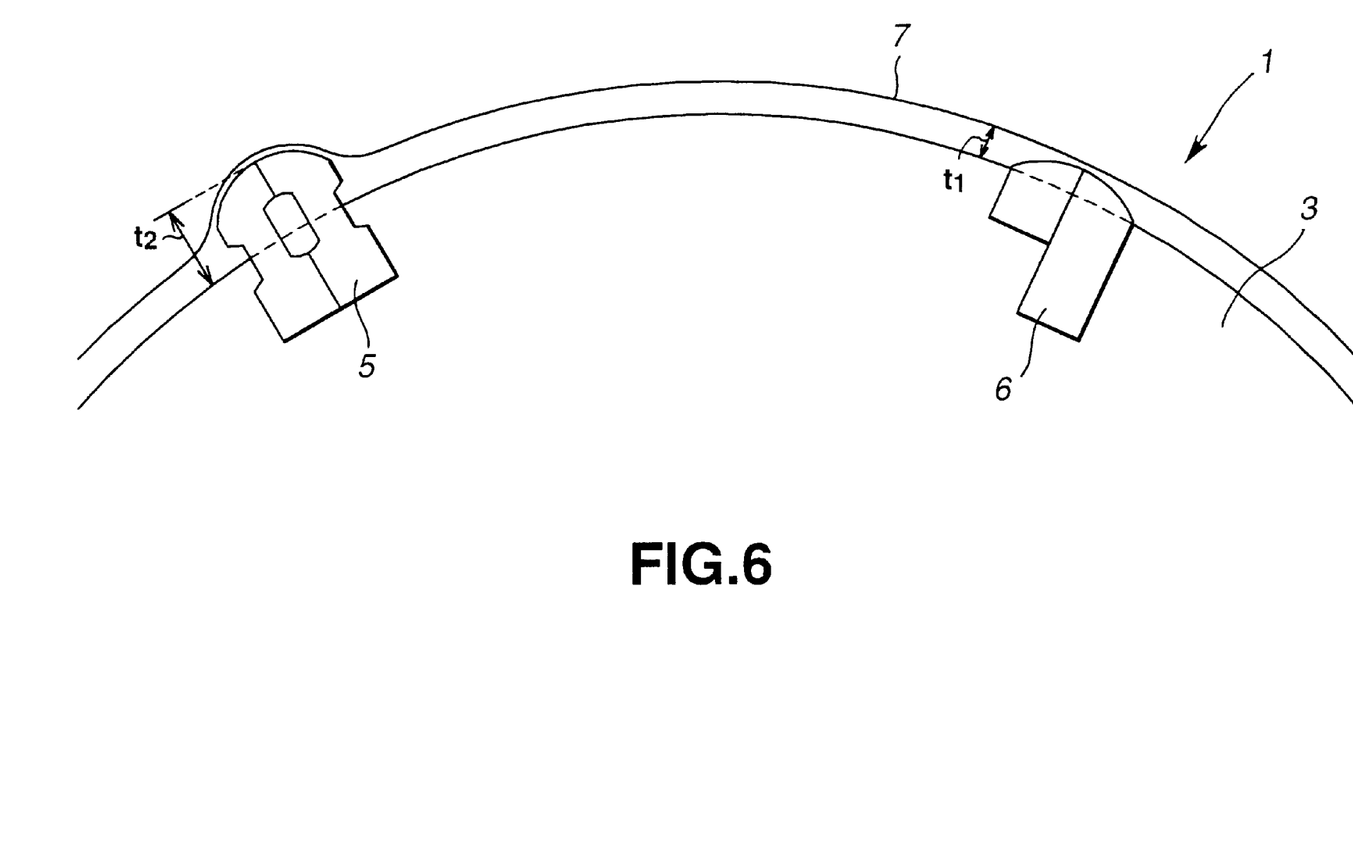
FIG. 6 shows the inductive magnetic head and the MR head loaded on the rotary drum protruded from the from the outer periphery of the rotary drum.

Thus, in the present rotary drum device 1, the MR head 6 is protruded from the outer periphery of the rotary drum 3 by a protruding amount t1 smaller than a protruding amount t2 of the inductive magnetic head 5 from the outer periphery of the rotary drum 3, as shown in FIG. 6, which schematically shows the state in which part of the inductive magnetic head 5, and part of the MR head 6 are protruded from the outer periphery of the rotary drum 3. As for the protruding amounts of the magnetic head, the protruding amount t2 of the inductive magnetic head 5 is of the order of 25 $\mu$m, while the protruding amount t1 of the MR head 6 is of the order of 15 $\mu$m.

In the present rotary drum device, in which the protruding amount t1 of the MR head 6 is selected to be smaller than the protruding amount t2 of the inductive magnetic head 5, the contact pressure between the MR head 6 and the magnetic tape 7 can be reduced as compared to that between the inductive magnetic head 5 and the magnetic tape 7 when the inductive magnetic head 5 and the MR head 6 are kept in sliding contact with the magnetic tape 7 for recording/reproduction. Therefore, with the present rotary drum device 1, it is possible to suppress attrition of the MR head 6 when the inductive magnetic head 5 and the MR head 6 are kept in sliding contact with the magnetic tape 7 to do the recording/reproduction.

Figure 7:
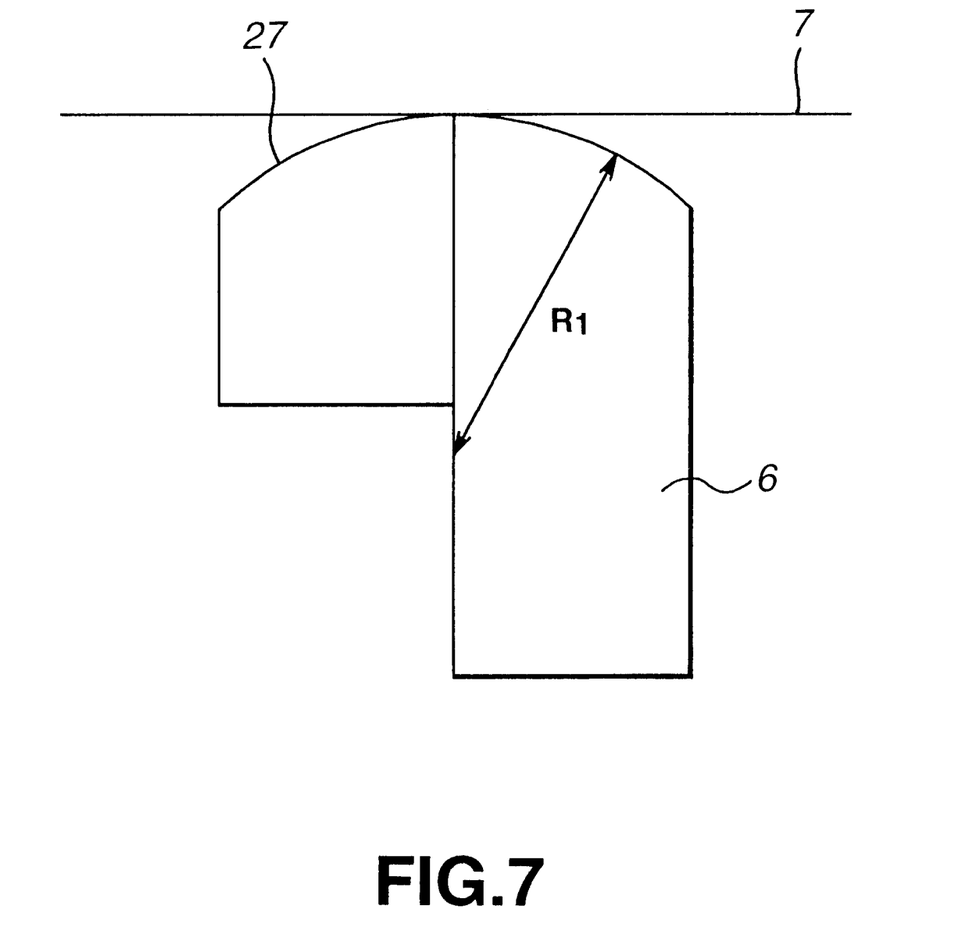
FIG. 7 shows the shape of a magnetic tape slide surface of the MR head loaded on the rotary drum.
Figure 8:
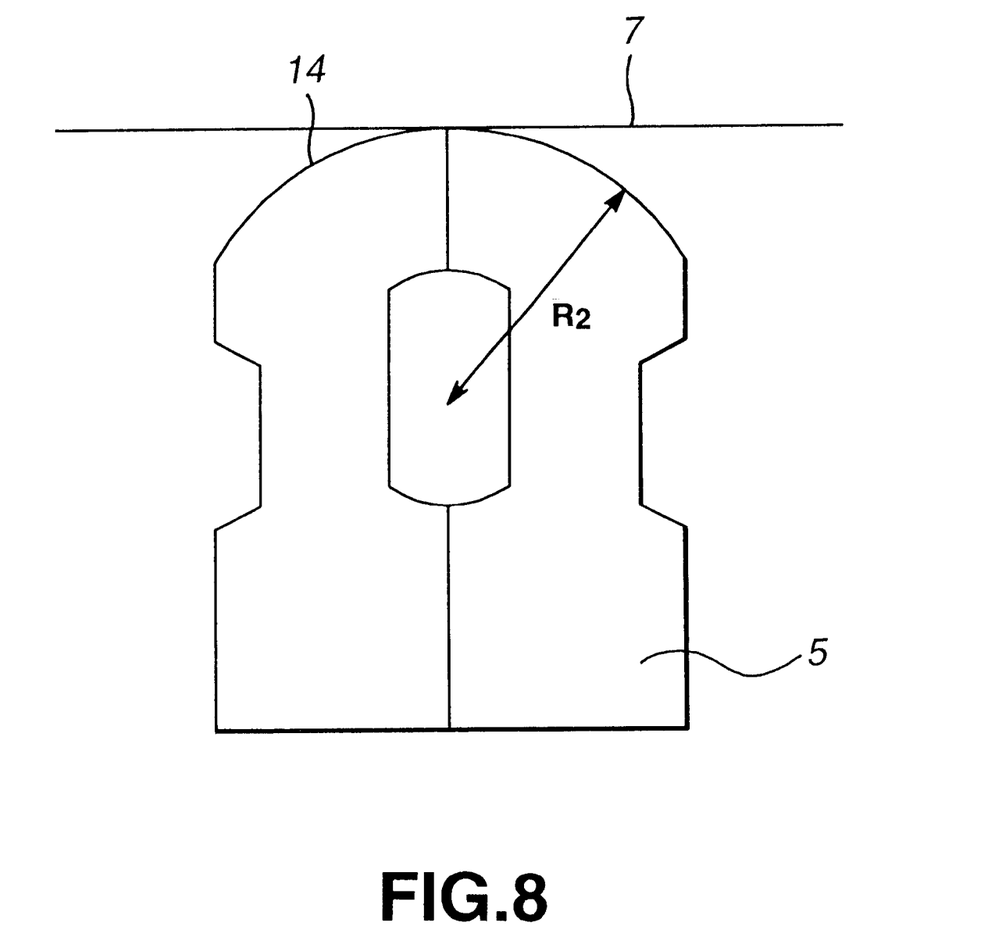
FIG. 8 shows the shape of a magnetic tape slide surface of the inductive head loaded on the rotary drum.

In the present rotary drum device 1, the radius of curvature R1 of the sliding surface 27 for the magnetic tape of the MR head 6 loaded on the rotary drum 3 can be set so as to be larger than the radius of curvature of the R2 of the sliding surface 14 for the magnetic tape inductive magnetic head 5 loaded on the rotary drum 3, as shown in FIGS. 7 and 8, showing the profile of the sliding surface 27 for the magnetic tape of the MR head 6 and that of the sliding surface 14 for the magnetic tape of the inductive magnetic head 5, respectively. Specifically, the radius of curvature R1 of the sliding surface 27 for the magnetic tape of the MR head 6 is set to, for example, approximately 1.5 mm, while the radius of curvature of the R2 of the sliding surface 14 for the magnetic tape inductive magnetic head 5 is set to, for example, 1 mm.

In this rotary drum device, in which the the radius of curvature R1 of the sliding surface 27 for the magnetic tape of the MR head 6 is set so as to be larger than the radius of curvature R2 of the sliding surface 14 for the magnetic tape inductive magnetic head 5, the contact area between the MR head 6 and the magnetic tape 7 is larger than that between the inductive magnetic head 5 and the magnetic tape 7 on the occasion of recording/reproduction with the inductive magnetic head 5 and the MR head 6 being in sliding contact with the magnetic tape 7.

If the contact area between the MR head 6 and the magnetic tape 7 is larger than that between the inductive magnetic head 5 and the magnetic tape 7, the contact pressure of the magnetic tape per unit area of the sliding surface 27 for the magnetic tape of the MR head 6 is smaller than that of the magnetic tape per unit area of the sliding surface 14 for the magnetic tape of the inductive magnetic head 5.

Therefore, with the present rotary drum device 1, it is possible to suppress attrition of the MR head 6 on the occasion of recording/reproduction with the inductive magnetic head 5 and the MR head 6 being kept in sliding contact with the magnetic tape 7.

Although the rotary drum device in which an inductive magnetic head and an MR head are loaded on a rotary drum has been described in the foregoing, the present invention may similarly be applied to a rotary drum device carrying plural inductive magnetic heads and plural MR heads or to the magnetic recording/reproducing apparatus employing this rotary drum device.

It is possible with the present invention to reduce the contact pressure between the MR head and the magnetic tape as compared to that between the inductive magnetic head and the magnetic tape to suppress attrition of the MR head.

Thus, it is possible with the present invention to realize a rotary drum device and a helical scan system magnetic recording/reproducing apparatus employing an MR head as a reproducing magnetic head.

What is claimed is:

1. A helical scan magnetic recording/reproducing apparatus for recording and playing back data on a magnetic tape, said apparatus comprising:

a cylindrically-shaped rotary drum;

an inductive magnetic head loaded on said rotary drum so that a portion thereof is protruded from the outer periphery of the rotary drum and contacts said magnetic tape at a pressure; and a magneto-resistive effect magnetic head loaded on said rotary drum so that a portion thereof is protruded from the outer periphery of the rotary drum and contacts said magnetic tape at a pressure;

wherein the amount of protrusion from the outer periphery of said rotary drum of said magneto-resistive effect magnetic head is smaller than an amount to protrusion from the outer periphery of said rotary drum of said inductive magnetic head so that the pressure between the magneto-resistive effect magnetic head is smaller than that between the inductive magnetic head and said tape.

2. The helical scan magnetic recording/reproducing apparatus according to claim 1 wherein the inductive magnetic head is a recording magnetic head and wherein said magneto-resistive effect magnetic head is a playback magnetic head.

3. The helical scan magnetic recording apparatus of claim 1 wherein said inductive magnetic head is protruded from the outer periphery of the rotary drum on the order, of 25 $\mu$m.).

4. The helical scan magnetic recording apparatus of claim 3 wherein said magneto-resistive effect magnetic head is protruded from the outer periphery of the rotary drum on the order of 15 $\mu$m.

* * * * *